Nov. 5, 1935.   G. W. LANGFORD   2,019,575
AIR CONDITIONER
Filed Oct. 9, 1931   2 Sheets-Sheet 2
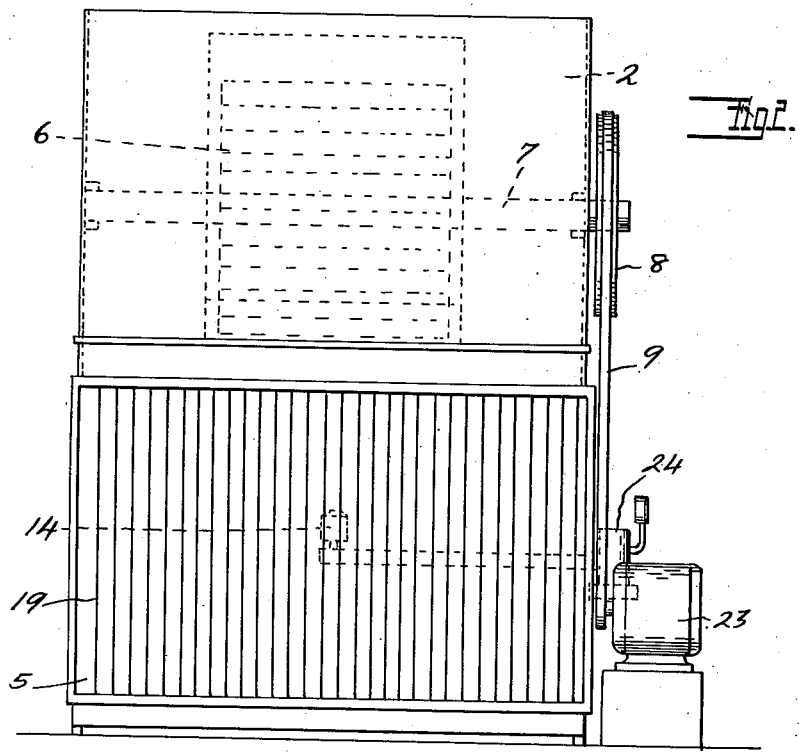
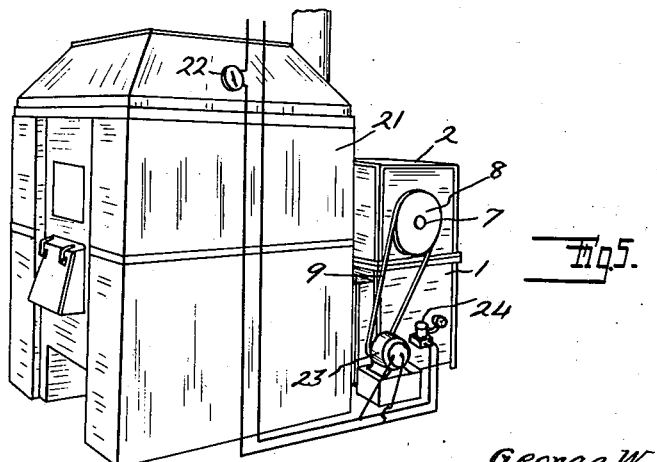
INVENTOR
George W. Langford
BY
ATTORNEYS

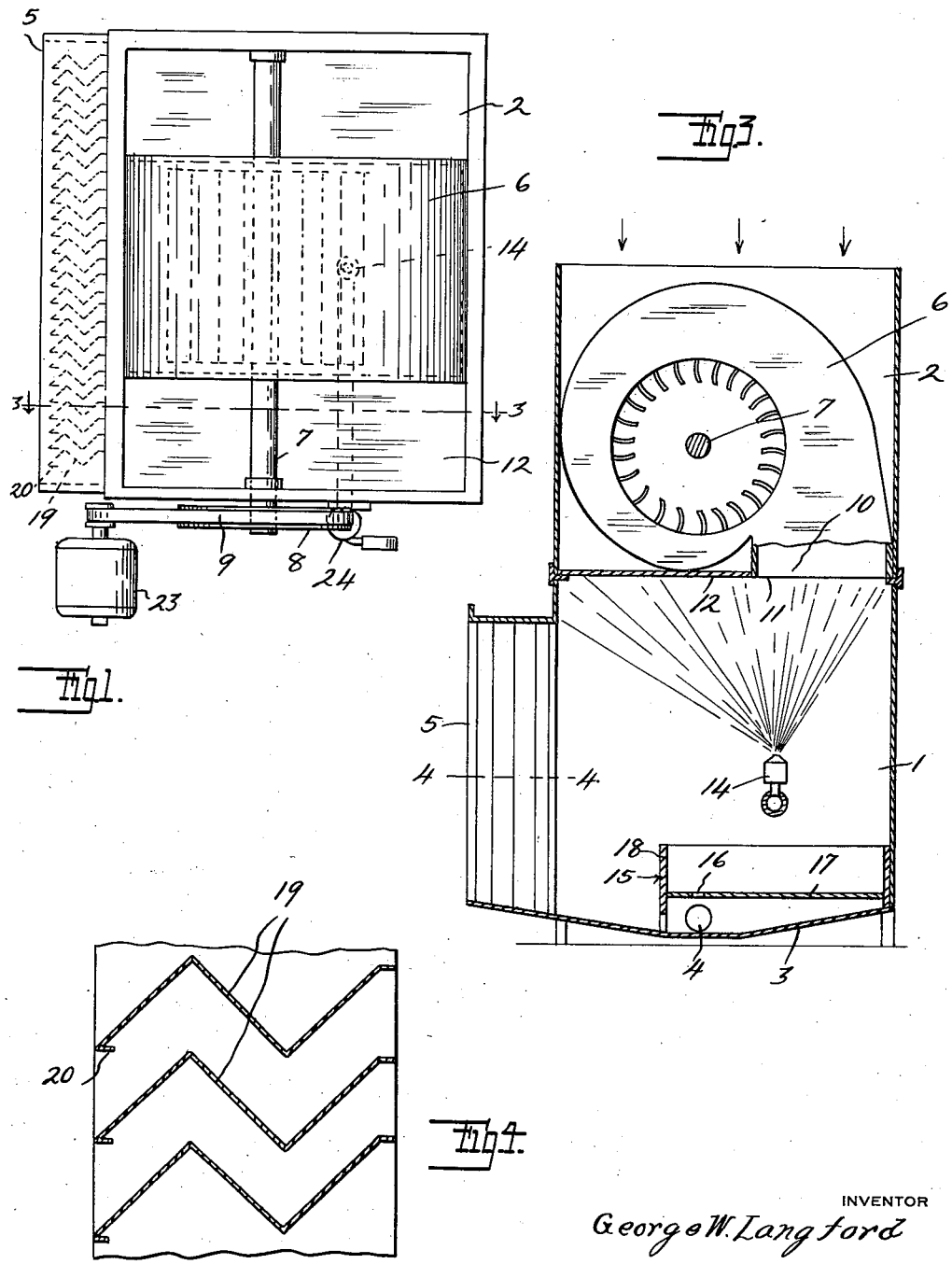

UNITED STATES PATENT OFFICE 2,019,575

AIR CONDITIONER

George W. Langford, Ann Arbor, Mich.

Application October 9, 1931, Serial No. 567,938

8 Claims. (Cl. 261—117)

The invention relates to air conditioners and has for one of its objects to provide an improved apparatus for humidifying, washing and freshening the air in cold weather and de-humidifying, washing and cooling the air in warm weather. Another object is to so construct the apparatus that it offers no appreciable resistance to the forced circulation of the air. A further object is to so construct the apparatus that it forms a single unit which is compact and occupies but little floor space. These and other objects of the invention will become apparent from the following description, taken in connection with the accompanying drawings, in which Figure 1 is a plan view of an air conditioner showing an embodiment of my invention;

Figure 2 is a rear elevation thereof;

Figure 3 is a cross section on the line 3—3 of Figure 1;

Figure 4 is a cross section on the line 4—4 of Figure 3;

Figure 5 is a perspective view of the air conditioner attached to a furnace.

The air conditioner, as illustrated in the drawings, comprises the mixing chamber 1 and the air blower chamber 2. The mixing chamber has the bottom wall 3 comprising portions sloping downwardly toward each other for conducting any liquid which has not been thoroughly comingled with the air to the liquid outlet 4 in an end wall of the mixing chamber, this liquid outlet being located at the depressed portion of the bottom wall. The mixing chamber has the outlet 5 in its rear wall and this outlet has a width co-extensive with that of the rear wall and a height slightly less than that of the rear wall. However in order to provide as large an outlet opening as possible within the limits of the chamber the lower side of the opening is shown herein as flush with the bottom wall 3 of the chamber.

The air blower chamber 2 is mounted upon and above the mixing chamber 1 and has located therein the centrifugal air blower 6, the rotor of which is mounted upon the shaft 7 upon one end of which is fixed the sheave or pulley 8. 9 is a suitable belt engaging this sheave or pulley and driven by suitable means such as an electric motor. The air blower 6 occupies the central portion of the air chamber 2 and has the outlet 10 opening downwardly and registering with the inlet 11 in the top wall 12 of the mixing chamber 1 adjacent to the front wall of the mixing chamber and at a substantial distance from its rear wall. The top of the air blower chamber 2 is open for the passage of air into this chamber and through the end portions thereof into the air blower unit 6.

The areas of the outlet 10 and the inlet 11 are small in comparison to the area of the top wall 12 of the mixing chamber 1 or of its horizontal cross sectional area and they are also small in comparison to the outlet 5 of the mixing chamber 1 so that a relatively slow discharge velocity of the conditioned air will be realized. 14 is a nozzle located within the mixing chamber 1 for discharging liquid under pressure, such as water, from a city water main. This nozzle is close to the outlet 10 and the inlet 11 and is in the path of the air flowing through this outlet and inlet. The nozzle further faces toward this outlet and inlet and discharges the liquid in an upward direction or a direction opposite to that taken by the air. By reason of this arrangement, the liquid is forced in a fine spray against a relatively small column of air, so that this liquid effectualy washes the air and further a minimum quantity of the liquid is required.

15 is a mixing box located within the lower portion of the mixing chamber 1 and below the nozzle 14. This mixing box is in the path of the air after it has flown through the liquid and has an open top or upper side so that the box receives the air and the liquid comingled therewith. The box is provided with a substantially horizontal bottom wall 17 and substantially vertical side walls 18 forming baffles so that the comingled air and liquid entering the box is deflected upwardly prior to being discharged out of the opening 5. As a result, the comingled air and liquid form a fine spray, thereby more thoroughly cleaning the air. It may be pointed out at this time that the area of the wall 17 presented to the fluid passing downwardly in the mixing chamber 1 is substantially greater than the area of the outlet opening 10 of the blower so as to permit the fluid to be deflected upwardly at the side of the down-coming blast from the blower. Any liquid not taken up by the air during the mixing operation flows through the outlet 16 in the bottom wall or baffle 17 of the mixing box and drains out through the outlet opening 4 formed in the mixing chamber 1 beneath the bottom wall 17. The side wall or baffle 18 of the mixing box, which is nearest to the outlet 5, is preferably continued downwardly beyond the bottom wall 17, but terminates above the bottom wall 3 of the mixing chamber 1 to assist in preventing the air from forcing any liquid in the depressed portion of the bottom wall through the outlet 5. The foregoing is particularly desirable in cases of the character illustrated herein, wherein the lower side of the discharge opening is flush with the bottom wall of the chamber, since with such an arrangement no obstruction to the flow of liquid out of the opening 5 is present.

19 are vertically extending spaced apart vanes located in the outlet 5 and having angle cross section and, more particularly, zig zag cross section, so that they change the direction of flow of comingled air and liquid passing therebetween. The rear ends of these vanes are preferably provided with return-bent flanges 20 which further tend to cause eddies and to collect any excess liquid in the air.

As shown, the air conditioner is connected to the furnace 21, which is provided within the upper part of its casing or, more particularly, within its hood with the thermostat 22. This thermostat automatically controls the operation of the air conditioner according to the temperature, the thermostat being adjusted to shut off, upon lowering of the temperature below a predetermined point, the electric motor 23 for driving the rotor of the air blower 6 and the solenoid valve 24 for controlling the flow of the liquid to the nozzle 14.

From the above description, it will be readily seen that I have provided an improved air conditioner which is highly efficient with the minimum amount of liquid. It will also be seen that I have provided a single unit construction of air conditioner which occupies but little floor space in that the air blower chamber is mounted upon and above the mixing chamber. It will be further seen that the outlet of the mixing chamber and the air conditioner may be directly connected to the casing of a heating unit.

What I claim as my invention is:

1. In an air conditioner, the combination with a chamber having a drain and a bottom wall inclined toward the drain, of an air blower having an outlet opening into said chamber with said outlet of smaller area than the cross sectional area of said chamber, a liquid discharge nozzle close to said outlet and in the path of the air flowing through said outlet, said nozzle facing toward said outlet and discharging the liquid in a direction opposite to that taken by the air, and means other than said bottom wall in the path of the air after it has flown through the liquid for intercepting the air and the liquid comingled therewith and deflecting the same in a direction opposite to the direction of flow of the air through the outlet opening of the blower.

2. In an air conditioner, the combination with a chamber having a bottom wall, of an air blower having an outlet opening into the upper portion of said chamber, a liquid discharge nozzle close to said outlet and in the path of the air flowing through said outlet, said nozzle facing toward said outlet and discharging the liquid in a direction opposite to that taken by the air, and means other than said bottom wall in the path of the air after it has flown through the liquid for intercepting the air and the liquid comingled therewith and deflecting the same in a direction opposite to the direction of flow of the air through the outlet opening of the blower.

3. In an air conditioner, the combination with a chamber having an outlet opening in a side wall thereof and having an inclined bottom wall portion, of an air blower positioned above the chamber and having a discharge opening communicating with the interior of the chamber through an outlet opening in the top wall of said chamber, a baffle member disposed substantially parallel to the top wall of the chamber and located in the latter below the outlet opening in said wall for reversing the direction of flow of the air discharged by the blower, a nozzle located within the chamber between the outlet opening in the upper wall thereof for the blower and the baffle and facing toward the latter outlet opening for discharging liquid in an upward direction, and a baffle extending upwardly from the end of the baffle aforesaid facing the outlet opening through the side wall of the chamber to prevent liquid accumulating on the first named baffle from being blown through the outlet opening in the aforesaid side wall of the chamber.

4. In an air conditioner, the combination with a chamber having a bottom wall, of an air blower having an outlet opening into the upper portion of said chamber, a liquid discharge nozzle located relatively close to the outlet and in the path of the air flowing through said outlet, said nozzle facing toward said outlet and discharging the liquid in a direction opposite to that taken by the air and a substantially horizontally disposed baffle supported above the bottom wall within the chamber in the path of the air after it has flowed through the liquid for intercepting the air and the liquid comingled therewith and deflecting the same in a direction opposite to the direction of flow of the air through the outlet opening of the blower.

5. In an air conditioner, the combination with a chamber having a drain in the lower portion thereof and having a bottom wall sloping toward said drain, of an air blower having an outlet opening into the upper portion of said chamber, a liquid discharged nozzle positioned relatively close to the outlet and in the path of the air flowing through said outlet, said nozzle facing toward said outlet and discharging the liquid in a direction opposite to that taken by the air, and a substantially horizontally disposed baffle located above the bottom wall aforesaid of the chamber in the path of the air after it has passed through the liquid and presenting an area for intercepting the air and the liquid comingled therewith greater than the area of the blower outlet opening and deflecting the fluid in a direction opposite to the direction of flow of the air through the outlet opening of the blower.

6. In an air conditioner, the combination with a chamber having a bottom wall and having an outlet opening in one side thereof, of an air blower having an outlet opening into the upper portion of said chamber, a liquid discharge nozzle located relatively close to the outlet and in the path of the air flowing through said outlet, said nozzle facing toward said outlet and discharging the liquid in a direction opposite to that taken by the air, means intercepting the air after it has passed through the liquid and compelling the same to move in the opposite direction including a substantially horizontally disposed baffle supported within the chamber above the bottom wall of the latter, and means preventing the liquid accumulating in the chamber from being blown through the outlet opening in the side wall of the chamber including another baffle positioned between the baffle aforesaid and the latter outlet opening.

7. In an air conditioner, the combination with a chamber having an inclined bottom wall and having an outlet opening in one side with the bottom of the outlet opening flush with the bottom wall of the chamber, of an air blower having an outlet opening into the upper portion of said chamber, a liquid discharge nozzle located relatively close to said outlet in the path of travel of the air flowing through said outlet and facing toward the latter so as to discharge liquid in a direction opposite to that taken by the air, a horizontally disposed baffle having an area greater than the area of the blower outlet opening and located within the chamber above the bottom wall thereof for intercepting the air passing through the liquid and compelling the same to move in the opposite direction, and a second baffle extending upwardly from said bottom wall between the outlet opening in the side wall of the chamber and the baffle aforesaid to prevent the liquid accumulating on said first named baffle from being blown through the latter outlet opening.

8. In an air conditioner, the combination with a chamber, of an air blower positioned above the chamber and having an outlet opening into the chamber through the top wall thereof, an outlet passage in one side wall of the chamber having a cross sectional area substantially greater than the cross sectional area of the blower outlet, means in said chamber directly below the blower outlet opening for reversing the direction of flow of the air discharged into the chamber by the blower, and a nozzle located within the chamber in close proximity to the blower outlet opening in the path of the air flowing through said outlet opening and facing toward the latter opening so as to discharge the liquid in a direction opposite to that taken by the air.

GEORGE W. LANGFORD.